United States Patent Office

2,864,824
Patented Dec. 16, 1958

2,864,824

ALKOXY DERIVATIVES OF 3:5-DIOXO-PYRAZOL-IDENE AND PROCESS FOR THEIR MANUFACTURE

Leonard Michelson, Rochester, N. Y., assignor to R. J. Strasenburgh Co., Rochester, N. Y., a corporation of New York No Drawing. Application August 31, 1956
Serial No. 607,286

2 Claims. (Cl. 260—310)

The present invention relates to a pharmaceutical composition comprising a carboxy derivative of 3:5-dioxopyrazolidine and includes the compound itself, compositions containing the compound and products such as tablets, capsules or solutions containing the compound.

The new compound corresponds to the general formula

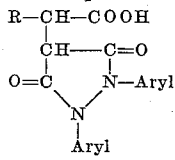

or to its tautomeric forms, as well as of their salts with inorganic and organic bases. In this formula and in those given later on: R means a hydrocarbon radical containing from 1–9 carbon atoms and R—CH is linked to the pyrazolidine nucleus by a non-quaternary carbon atom, R is more particularly a saturated or unsaturated aliphatic radical, a cycloaliphatic radical, or a phenyl substituted aliphatic radical whose phenyl nucleus may further be substituted by halogen, a lower alkyl or alkoxy radical containing 1–3 carbon atoms, and aryl means a phenyl radical unsubstituted or substituted by halogen, a lower alkyl or alkoxy radical containing 1–3 carbon atoms.

In the above definition a non-quaternary carbon atom means a carbon atom which is connected with at least one hydrogen atom. Thus a —CH₂— group each free valency thereof being connected to a carbon atom contains a secondary carbon atom, whereas the —CH— group, each free valency thereof being connected to a carbon atom contains a tertiary carbon atom.

The compositions of this invention like the composition described in Geigy Patent No. 2,562,830 exercise anti-pyretic, analgesic and anti-inflammatory action. They produce general improvement, reduction of swelling and spasticity, and increase mobility coincident with the relief of pain.

However, applicant's compositions have a great advantage over phenyl butazone and similar compounds disclosed in the Geigy Patent No. 2,562,830 in that they are more soluble in water and are, therefore, more effective. Thus the dosage can be made smaller.

The minimum effective single dosage or so-called minimum dosage unit for

1:2 diphenyl-4—CH₃—CH₂—CH—
  COOH-3:5-dioxopyrazolidine its alkali salts and like compounds is 25 mgs. The product should ordinarily not be used in more than 2000 mgs. per unit dose in order to avoid toxic hazard.

The product may be administered in the form of tablets, capsules or solutions. Suitably it may be used in a 50 mg. tablet given 3 or 4 times daily.

The following examples illustrate the invention:

EXAMPLE 1

1,2-diphenyl-3,5-dioxo pyrazolidine was dissolved in NaOH, and 2-bromo butyric acid was added. The solution was kept at 70° F. for 4 hours, cooled and acidified with 10% HCl, filtered, washed and dried. The dry solids were refluxed with 10 cc. benzene per gm. of solids; filtered hot and the insolubles were washed. The benzene insoluble fraction was the crude COOH derivative.

Purified by (1) methyl alcohol recrystallization, (2) dissolving in dilute alkali, making strong alkaline, filtering off Na salt, redissolving Na salt in H₂O, charcoaling and reprecipitating with HCl.

The compound had the following formula:

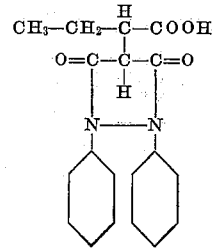

Melting point: 215–16
Color: White
Solubility:
  Soluble—hot methyl alcohol, dilute NaOH
  Insoluble—benzene, strong alkali
Percent N:
  Theoretical—8.5
  Found by assay—7.9 (unpurified sample)

The dioxo-pyrazolidine derivatives prepared according to the invention can also form salts with basic compounds simply by neutralizing the acid compound with a basic compound such as sodium hydroxide, potassium hydroxide, calcium hydroxide, or magnesium hydroxide. Organic bases may also be used such as ethylene diamine, triethanolamine or trimethylamine.

The alkali salts and the amine salts possess a high degree of solubility, much more so than the salts described in the Geigy Patent No. 2,562,830 since such salts are true salts of a base and a soluble acid rather than salts made from the enol form of a ketone. They are also much easier to prepare, are obtained in greater yield, and are pharmaceutically more effective in lesser dosages than the enol type salts.

EXAMPLE 2

The method of Example 1 was repeated using various bromo fatty acids in place of the bromo butyric acid of Example 1. Satisfactory results were obtained with 2-bromo propionic acid and 2-bromo valeric acid. The cycloalkoxy acids may also be used, and also aliphatic acids containing a phenyl substitution are suitable.

In general, however, the number of carbon atoms in the acid should be from 2 to 10.

Instead of using the bromo acid, I can react the pyrazolidine derivative with any compound of the formula R—X where X can mean Cl, Br, I, SO₄R or SO₃ aryl, and R is the alkoxy radical containing from 2 to 10 carbon atoms.

Any of the compounds produced by the examples of Geigy Patent No. 2,562,830 can readily be made into the COOH derivative by the procedure set forth above, and also the following compounds by such methods can be prepared:

*General formula*

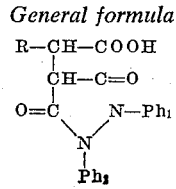

| Ph₁ | Ph₂ | R |
|---|---|---|
| C₆H₅ | C₆H₅ | CH₃ |
| C₆H₅ | C₆H₅ | C₂H₅ |
| C₆H₅ | C₆H₅ | CH₂—CH=CH₂ |
| C₆H₅ | C₆H₅ | iso—C₄H₉ |
| C₆H₅ | C₆H₅ | CH₂—CH=CH—CH₃ |
| C₆H₅ | C₆H₅ | n-C₅H₁₁ |
| C₆H₅ | C₆H₅ | iso—C₅H₁₁ |
| C₆H₅ | C₆H₅ | CH(CH₃)—CH₂—CH(CH₃)₂ |
| C₆H₅ | C₆H₅ | CH₂—C₆H₃(OCH₃)(OCH₃) |
| C₆H₅ | C₆H₅ | CH₃—CH—CH₂—CH₃ |
| C₆H₅ | C₆H₅ | n—C₇H₁₅ |
| C₆H₄—CH₃(p) | C₆H₄—CH₃(p) | iso—C₃H₇ |
| C₆H₄—CH₃(p) | C₆H₄—CH₃(p) | n—C₄H₉ |
| C₆H₄—Cl(p) | C₆H₅ | n—C₄H₉ |
| C₆H₄—Cl(p) | C₆H₄—Cl(p) | n—C₄H₉ |
| C₆H₄—OCH₃(p) | C₆H₄—OCH₃(p) | n—C₄H₉ |
| C₆H₄—OC₂H₅(p) | C₆H₅ | n—C₄H₉ |

It is to be understood that the invention is broad in scope and is not to be restricted except by the claims, in which it is my intention to cover all formulas and proportions of ingredients herein set forth, and avail myself of all changes within the scope of the appended claims.

I claim:
1. As a new compound, 1:2-diphenyl-4CH₃—CH₂—CH—COOH-3:5-dioxopyrazolidine.
2. A pharmaceutically acceptable salt of the compound of claim 1.

References Cited in the file of this patent

FOREIGN PATENTS 1,048,710    France _____ Aug. 5, 1953